United States Patent [19]

Maeba

[11] Patent Number: 4,510,562

[45] Date of Patent: Apr. 9, 1985

[54] STABILIZING POWER-SUPPLY CIRCUIT

[75] Inventor: Yukio Maeba, Kyoto, Japan

[73] Assignee: Murata Manufacturing Co., Ltd., Japan

[21] Appl. No.: 536,198

[22] Filed: Sep. 27, 1983

[30] Foreign Application Priority Data

Sep. 28, 1982 [JP] Japan .................................. 57-170617

[51] Int. Cl.³ .......................................... H02M 3/335
[52] U.S. Cl. .......................................... 363/19; 363/97
[58] Field of Search ..................................... 363/18–21, 363/78, 95, 97, 124, 131; 331/112

[56] References Cited

U.S. PATENT DOCUMENTS

| 4,005,351 | 1/1977 | Blum | 363/21 X |
| 4,084,219 | 4/1978 | Furukawa et al. | 363/19 X |
| 4,224,659 | 9/1980 | Iguchi | 363/20 |
| 4,322,787 | 3/1982 | Kraus | 363/21 |
| 4,420,804 | 12/1983 | Nishino | 363/21 |

Primary Examiner—Peter S. Wong
Attorney, Agent, or Firm—Ostrolenk, Faber, Gerb & Soffen

[57] ABSTRACT

A stabilizing power-supply circuit adapted to apply the output signals of a comparison amplifier directly upon the base circuit of the oscillation transistor of an oscillating circuit through a zener diode. The oscillation is reduced to a given output voltage during the no-load thereby to protect the power-supply apparatus.

14 Claims, 7 Drawing Figures

STABILIZING POWER-SUPPLY CIRCUIT

BACKGROUND OF THE INVENTION

The present invention relates to a stabilizing power-supply circuit.

As shown in the block diagram of FIG. 1, in the conventional stabilizing power-supply circuit, it has been proposed one portion of the output of the oscillation circuit to be caused a negative feedback to a control circuit composed of a control transistor through a comparison circuit to control the oscillation circuit so that the stabilized output may be provided. However, in such a stabilizing power-supply circuit, the efficiency was reduced due to the inevitable loss, such as the collector loss of a control transistor, caused in the control circuit. Moreover, in the high power, a radiation unit had to be made large due to more heat generated by the control transistor, thus interfering with the smaller size and lower cost of the power-supply apparatus. To settle such problems as described hereinabove, the oscillation transistor of the oscillation circuit is expected to be directly controlled by the negative feedback signal after the elimination of the control circuit. However, the direct controlling of the oscillation transistor after the elimination of the control circuit causes the high output voltage during the no-load, thus causing new problems such as the apparatus damages, troubles or the like.

SUMMARY OF THE INVENTION

An object of the present invention is to provide a stabilizing power-supply circuit, which can eliminate the disadvantages inherent in the conventional apparatus as mentioned above and which does not produce the high output voltage during the no-load even if the control circuit is eliminated, and is simple in construction.

Another object of the present invention is to provide a stabilizing power-supply circuit, which is adapted to apply the negative feedback signal upon the base circuit of the oscillation transistor through the zener diode.

A further object of the present invention is to provide a stabilizing power-supply circuit, which is small in size, secure in function, and low in cost.

According to the present invention, there provides a stabilizing power-supply circuit comprising a collector tuning type oscillation circuit, an output circuit for drawing out the output voltage from the output coil magnetically coupled to the tuning coil of the oscillation circuit, a detection circuit for detecting the variation in the output of the output circuit, a comparison amplifier for comparing the signal from the detection circuit with the reference voltage thereby to amplify the value of difference between the signal and voltage, wherein the output signal of the comparison amplifier is adapted to be applied upon the base circuit of the oscillation transistor of said oscillating circuit through a zener diode.

BRIEF DESCRIPTION OF THE DRAWINGS

These and other objects, features, aspects and advantages of the present invention will become more apparent from the following detailed description of the present invention when taken in conjunction with the accompanying drawings, in which.

DESCRIPTION OF THE PREFERRED EMBODIMENTS

Figure 1:
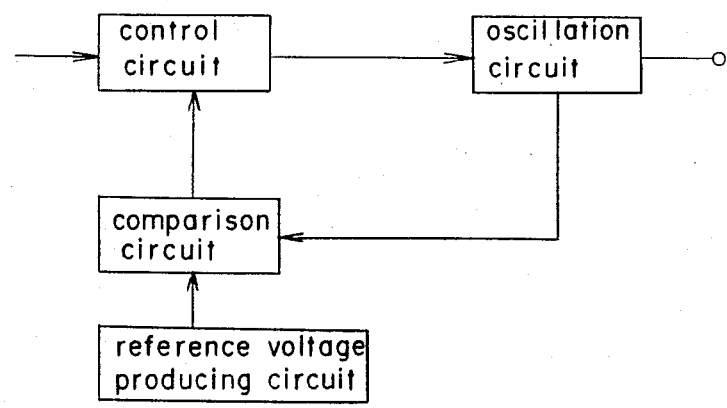
FIG. 1 is a schematic block diagram of the conventional stabilizing power-supply circuit as referred to above.
Figure 2:
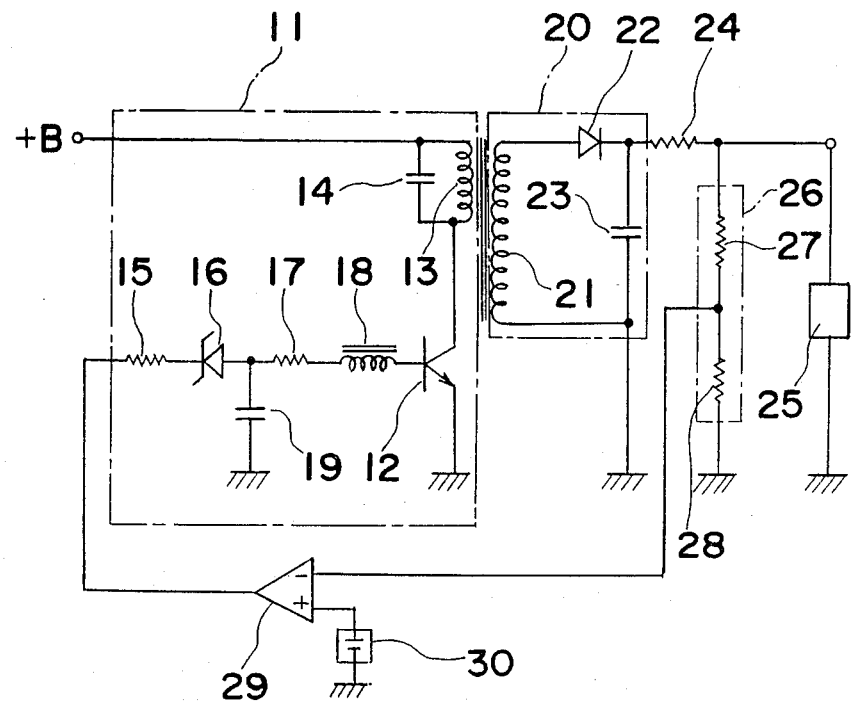
FIG. 2 is a circuit diagram showing a stabilizing power-supply circuit in one embodiment of the present invention.

Referring to FIG. 2, there shows a stabilizing power-supply circuit, constituting a constant-voltage power supply, including a collector tuning type oscillation circuit 11, wherein a tuning circuit is provided with a tuning coil 13 connected in parallel to a tuning capacitor 14, and connected to the collector of an oscillation transistor 12, an input voltage +B being applied to the coil 13 of the oscillation circuit 11. In the oscillation circuit 11, a base resistor 15, a zener diode 16, an oscillation stabilizing resistor 17 and a positive feedback coil 18 are connected in series to the base of the oscillation transistor 12, while a regenerative capacitor 19 is connected between an earth and a connecting point between the zener diode 16 and the stabilizing resistor 17. It is to be noted that the zener diode 16 is connected in its anode side onto the base side of the oscillation transistor 12 through the resistor 17 and coil 18, and the positive feedback coil 18 is magnetically coupled to the turning coil 13. The emitter of the oscillation transistor 12 is connected to an earth potential. Also, there is an output circuit 20 including an output coil 21, which is magnetically coupled to the tuning coil 13, and has the number of turns corresponding to the given output voltage, and a commutating circuit composed of a diode 22, having its anode connected to one end of the output coil 21, and a smoothing capacitor 23 connected between the cathode of diode 22 and the other end of coil 21, which is connected to the earth potential. A load 25 is connected to the diode 22 through a resistor 24 for spark discharge prevention use to the output circuit. A detection circuit 26 is provided between the output side of output circuit 20 and the earth potential and is composed of detection resistors 27, 28 for detecting the variation in the output voltage of the output circuit 20. A comparison amplifier 29 is connected at its output terminal with the resistor 15, at its convert input terminal with a connect point of the resistors 27, 28 and at its non-convert input terminal with the reference voltage producing circuit 30. The comparison amplifier 29 is provided for the comparison between the signal from the detecting circuit 26 and the reference voltage produced from the reference voltage producing circuit 30 and, at the same time, amplifies the difference therebetween. The comparison amplifier 29 is formed of a single-ended supply type, such that one power receiving terminal is connected the power supply, and the other power receiving terminal is connected to ground. The output signals of the comparison amplifier 29 are fed to the base resistor 15.

Figure 3:
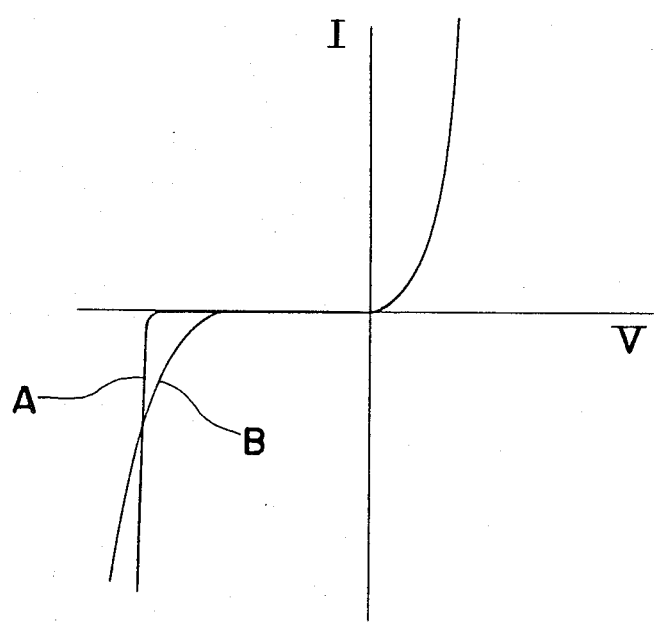
FIG. 3 is a voltage-current characteristic graph of a zener diode employed in the circuit of FIG. 2.

A constant-voltage power supply circuit constructed as described hereinabove operates as follows. In the initial stage where the oscillation of the oscillation circuit 11 starts, the signal from the comparison amplifier 29 is applied to the base of the oscillation transistor 12 through the base resistor 15, etc. to cause the oscillation transistor 12 to conduct so that a current flows to the tuning coil 13 by the input voltage +B. Therefore, an induction voltage is caused in the positive feedback coil 18 magnetically coupled to the tuning coil 13 so that the base side of the oscillation transistor 12 is made positive, and the side of the capacitor 19 is made negative. The oscillation is grown by the repeated charge and discharge operations of the regenerative capacitor 19 to cause the oscillation circuit 11 to be steady. Thus, a given voltage is adapted to be drawn to the output circuit 20. When the output voltage varies due to variations in the input voltage or the load, the variation portion is detected by the detection circuit 26. The base current of the oscillation transistor 12 is control by the output signal of the comparison amplifier 29 to stabilize the output voltage of the output circuit. Once the load 25 is made no-load, the output voltage of the output circuit 20 rises. The variation of the output voltage is detected by the detection circuit 26. The comparison amplifier 29 operates in the direction of controlling the oscillation. The output voltage of the comparison amplifier 29 at this time is set to become lower than the zener voltage of the zener diode 16 so that the base current of the oscillation transistor 12 becomes a minute value, which is close to a breaking condition, to damp the oscillation, and a given output voltage can be provided. In the no-load condition, the oscillation is control by the use of the zener curve of the zener diode 16. Thus, the zener diode 16 is preferred to have such a gentle zener curve as shown with a reference character B, instead of such a sharp zener curve as shown with a reference character A in FIG. 3. This is the reason why intermittent oscillation is caused no more due to the smooth control of the base current of the oscillation transistor in such characteristics as in reference character B, although the intermittent oscillation is caused in such characteristics as in reference character A. To obtain such a gentle zener curve as in reference character B it may be established by an arrangement of high resistors in parallel connection with the zener diode having such sharp characteristics as in reference character A, or an arrangement of a diode in series connected with the zener diode, the polarity of the diode being reversed to that of zener diode. Suppose that the zener diode 16 does not exist, and if and when there is no load, the output of the comparison amplifier 29 to be inputted to the base circuit of the oscillation transistor 12 becomes a slightly lower value than the voltage of the reference voltage producing circuit 30, because the comparison amplifier 29 is formed of a type of single ended supply, whereby the base current flows more than necessary. Thus, the high no-load output voltage is caused in the output circuit 20 by the charge and discharge operations of the regenerative capacitor 19, resulting in possible damages to the apparatuses using the power supply. If and when the negative voltage is applied upon the base circuit of the oscillation transistor 12 during the no-load, the base current of the oscillation transistor may be maintained at a very small amount value, which is close to an interrupting condition, and the oscillation is damped to provide a given output voltage. However, the circuit becomes complicated, causing the cost to be higher.

Figure 4:
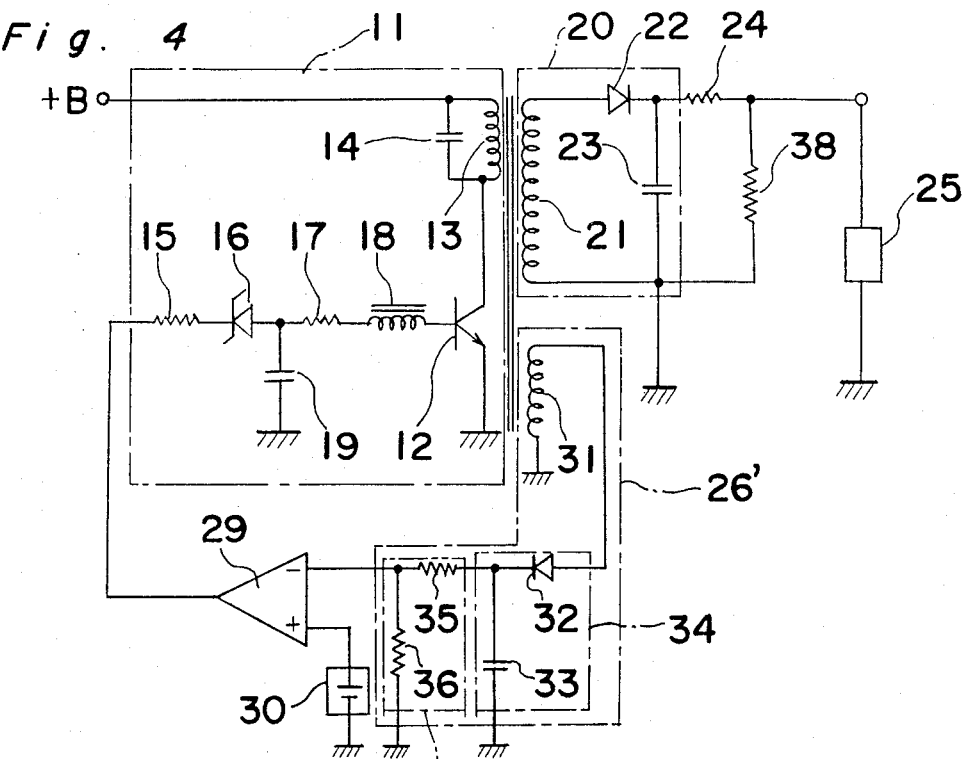
FIGS. 4 to 7 are other embodiments of a stabilizing power supply circuit constructed in accordance with the invention.

In the stabilizing power-supply circuit of the above-described embodiment, the constant-voltage power supply is composed by the constant-voltage control, the output of which is always positive. The stabilizing power-supply circuit is not necessarily restricted to the above-described circuit construction, in the construction of the constant-voltage power supply, but can be variable modified. For example, the stabilizing resistor 17 in the oscillation circuit 11 may be removed if necessary. Also, the position of the zener diode 16 may be changed to be on the side of the comparison amplifier 29 beyond the resistor 15 instead of the side of the regenerative capacitor 19, so that the position of the zener diode is not restricted to the position shown in FIG. 2. Also, the resistor 24 for spark discharge prevention use in the output circuit 20 is not indispensable. Furthermore, to obtain the alternating current in the output circuit 20, the diode 22 and the capacitor 23 are not required. To draw the alternating current to the output circuit 20, the output of the detection circuit 26 is required to be inputted to the comparison amplifier 29 through the rectification circuit. In addition, the detection circuit 26 may be, instead of resistors 27, 28 connected to the output circuit 20, composed of a detecting coil 31 wound in magnetic-coupling with the output coil 21, a rectifying circuit 34 including a diode 32 and a smoothing capacitor 33 for rectifying detecting voltage to be generated within the detecting coil 31, a voltage-dividing circuit 37 including a pair of voltage-dividing resistors 35, 36 for dividing direct-voltage to be obtained from the rectifying circuit 34, as shown in FIG. 4. In this case, a resistor 38 for discharging is provided in place of the detection circuit 26 of FIG. 2. It is to be noted that the operation of this case is almost identical to that of the detection circuit 26 of FIG. 2.

Figure 5:
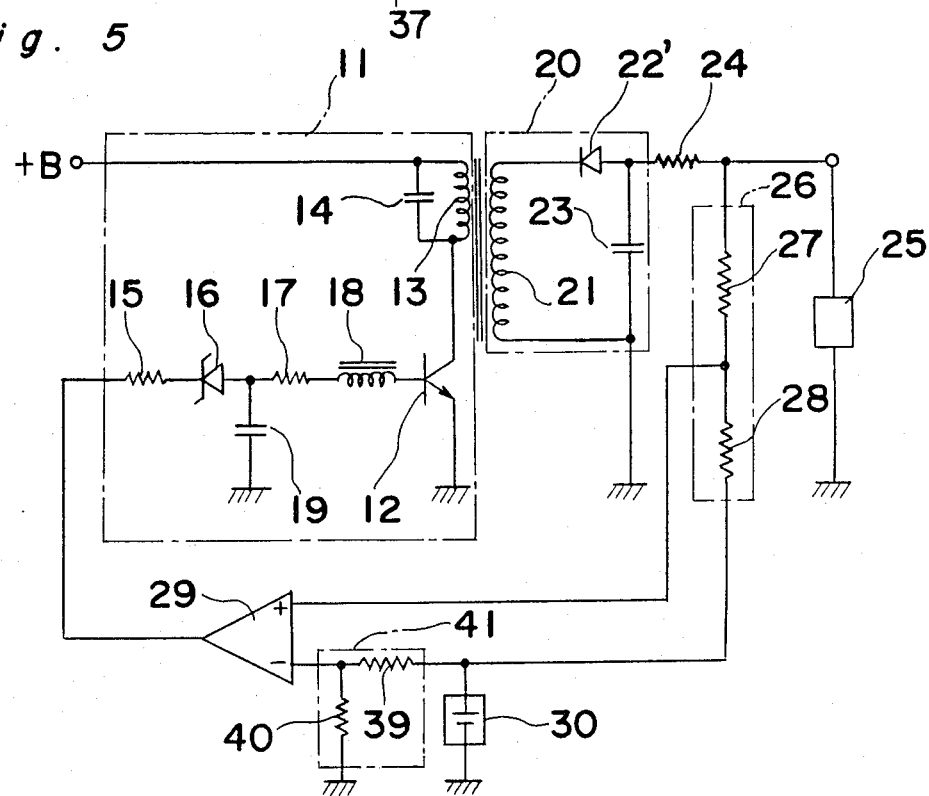
Figure 6:
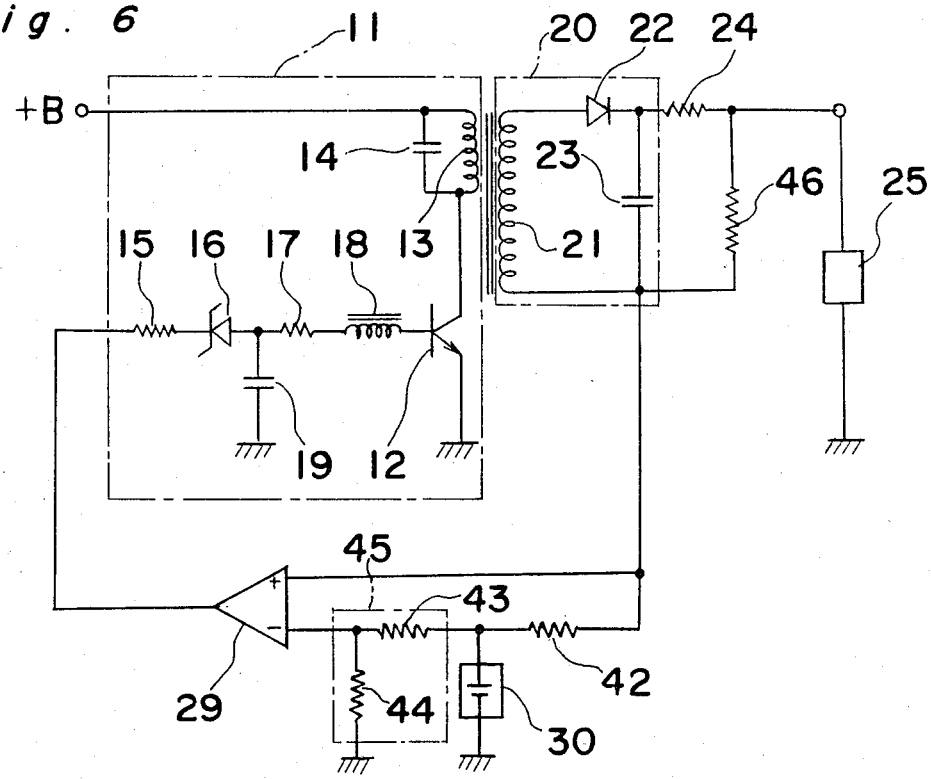
Figure 7:
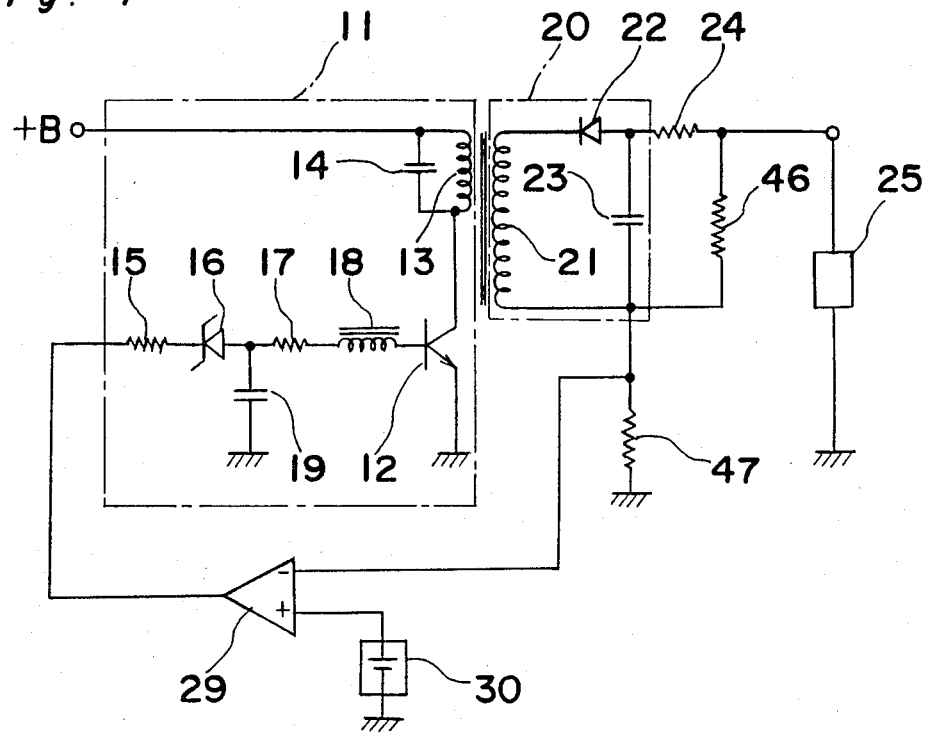

Also, although the arrangement of FIG. 2 is provided with a constant voltage power source to obtain a positive output voltage, a negative output voltage is obtained by a constant voltage power source constituted as shown in FIG. 5. In FIG. 5, new arrangement is provided in that a diode 22 is connected in the polarity direction opposite to that of the diode 22 connecting to the output circuit 20 of FIG. 2, the end portion of the resistor 28 in the detection circuit 26 is connected to the convert input terminal of the comparison amplifier 29 through a voltage dividing circuit 41 including a pair of resistors 39, 40, the output terminal of the detection circuit 26 is connected to the non-convert input terminal of the comparison amplifier 29, and the reference voltage producing circuit 30 is connected to the convert input terminal of the comparison amplifier 29 through the voltage dividing circuit 41. In this case, the arrangement of other elements is entirely similar to that of FIG. 2, and the operation is almost identical to that of FIG. 2. While the constant voltage power source constituting a detection circuit with employing the detecting coil 31 as shown in FIG. 4 is provided to obtain a positive output voltage, if it is intended to obtain a negative output voltage in the employment of the detecting coil 31, it can be obtained merely by changing in reverse the polarity direction of the diode 22 in the detection circuit 20. In this arrangement, it is not a problem to maintain the connection of the detection circuit 26 not to change or to change the connection of the detecting coil 31 in the opposite direction. Furthermore, the stabilizing power-supply circuit of the present invention is not restricted to the constant voltage power source, and can be construed by a constant current power source to be adapted to provide a constant current control, as shown within FIGS. 6 and 7. Referring to FIG. 6, there shows a constant current power source for obtaining positive output, wherein the one terminal of output coil 21, of which the other terminal is connected to the diode 22, is directly connected to the non-convert input terminal of the comparison amplifier 29 and is branched off to connect with the convert input terminal of the comparison amplifier 29 through a detecting resistor 42 and a voltage-dividing circuit 45 including a pair of resistors 43, 44, and the reference voltage producing circuit 30 is connected to the convert input terminal of the comparison amplifier 29 through the voltage-dividing circuit 45. In this case, a resistor 46 for discharging is connected in parallel to the smoothing capacitor 23 through a resistor 24 for killing spark discharge, and the arrangement of other elements is entirely similar to that of FIG. 2. Referring to FIG. 7, there shows a constant current power source for obtaining negative output, wherein the diode 22 is connected in a direction opposite to that of FIG. 6 such that the one terminal of output coil 21 is connected to the cathode of the diode 22, while the other terminal is connected to the ground through a detecting resistor 47. The output terminal of the detecting resistor 47, which is connected to the other terminal of output coil 21, is connected to the convert input terminal of the comparison amplifier 29. In this case, the reference voltage producing circuit 30 is connected to the nonconvert input terminal of the comparison amplifier 29, and the arrangement of other elements is entirely similar to that of FIG. 6. In the stabilizing power-supply circuit of the present invention as described hereinabove, the negative feedback signal is adapted to be directly applied to the base circuit of the oscillation transistor through the zener diode. Accordingly, the conventional control circuit composed of control transistors becomes unnecessary to improve the efficiency so that the power supply apparatus is rendered smaller in size and lower in cost. The present invention has a superior advantage of reducing the oscillation to a given output voltage during the no-load thereby to protect the power supply apparatus.

Although the present invention has been fully described in connection with the preferred embodiments thereof with reference to the accompanying drawings, it is to be noted that various changes and modifications are apparent to those skilled in the art. Such changes and modifications are to be understood as included within the scope of this invention unless they depart therefrom.

What is claimed is:

1. A stabilizing power-supply circuit comprising an oscillation circuit of collector tuning type including a base circuit of an oscillation transistor and a tuning coil, an output circuit including an output coil, which is magnetically coupled to the tuning coil of the oscillation circuit, for producing an output voltage, a detection circuit for detecting the variation in the output of the output circuit, a comparison amplifier of single ended supply type for the comparison between the signal from the detection circuit and a reference voltage, and for amplifying the difference therebetween, and a zener diode of which cathode is connected to the comparison amplifier, the output voltage of the comparison amplifier being adapted to be applied upon the base circuit of the oscillation transistor through the zener diode and being set to become lower than the zener voltage of the zener diode in the no-load condition.

2. The stabilizing power-supply circuit defined in claim 1, wherein the detection circuit comprises at least one resistor connected to the output circuit.

3. The stabilizing power-supply circuit defined in claim 1, wherein the detection circuit comprises a detecting coil magnetically coupled to the output coil of the output circuit.

4. The stabilizing power-supply circuit defined in claim 1, wherein the zener diode has a characteristic of a gentle curve in rising of current relating to voltage.

5. The stabilizing power-supply circuit as defined in claim 1, wherein the detection circuit is adapted to apply a constant voltage, so that the stabilizing power-supply circuit is constituted as a constant voltage power supply of constant voltage control.

6. The stabilizing power-supply circuit as defined in claim 1, wherein the detection circuit is adapted to apply a constant current, so that the stabilizing power-supply circuit is constituted as a constant current power supply of constant current control.

7. The stabilizing power-supply circuit defined in claim 2, wherein the zener diode has a characteristic of a gentle curve in rising of current relating to voltage.

8. The stabilizing power-supply circuit as defined in claim 2, wherein the detection circuit is adapted to apply a constant voltage, so that the stabilizing power-supply circuit is constituted as a constant voltage power supply of constant voltage control.

9. The stabilizing power-supply circuit as defined in claim 2, wherein the detection circuit is adapted to aply a constant current, so that the stabilizing power-supply circut is constituted as a constant current power supply of constant current control.

10. The stabilizing power-supply circuit defined in claim 3, wherein the zener diode has a characteristic of a gentle curve in rising of current relating to voltage.

11. The stabilizing power-supply circuit as defined in claim 3, wherein the detection circuit is adapted to apply a constant voltage, so that the stabilizing power-supply circuit is constituted as a constant voltage power supply of constant voltage control.

12. The stabilizing power-supply circuit as defined in claim 4, wherein the detection circuit is adapted to apply a constant voltage, so that the stabilizing power-supply circuit is constituted as a constant voltage power supply of constant voltage control.

13. The stabilizing power-supply circuit as defined in claim 7, wherein the detection circuit is adapted to apply a constant voltage, so that the stabilizing power-supply circuit is constituted as a constant voltage power supply of constant voltage control.

14. The stabilizing power-supply circuit as defined in claim 10, wherein the detection circuit is adapted to apply a constant voltage, so that the stabilizing power-supply circuit is constituted as a constant voltage power supply of constant voltage control.

* * * * *